(12) United States Patent
Kojima et al.

(10) Patent No.: US 8,174,241 B2
(45) Date of Patent: May 8, 2012

(54) METHOD OF PROTECTING ELECTRICITY STORAGE DEVICE IN HYBRID DC POWER SUPPLY SYSTEM

(75) Inventors: Yasushi Kojima, Utsunomiya (JP); Yutaka Asano, Utsunomiya (JP); Seigo Murashige, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 445 days.

(21) Appl. No.: 12/399,354

(22) Filed: Mar. 6, 2009

(65) Prior Publication Data

US 2009/0230917 A1 Sep. 17, 2009

(30) Foreign Application Priority Data

Mar. 14, 2008 (JP) ................. 2008-065588

(51) Int. Cl.
*H02J 7/00* (2006.01)
(52) U.S. Cl. ........................ 320/134; 320/104
(58) Field of Classification Search .................. 320/134, 320/104
See application file for complete search history.

(56) References Cited

U.S. PATENT DOCUMENTS

| | | | | |
|---|---|---|---|---|
| 5,334,463 | A * | 8/1994 | Tajima et al. | 429/9 |
| 6,094,034 | A * | 7/2000 | Matsuura | 320/134 |
| 6,777,909 | B1 | 8/2004 | Aberle et al. | |
| 2004/0065489 | A1 * | 4/2004 | Aberle et al. | 180/65.1 |
| 2007/0068714 | A1 * | 3/2007 | Bender | 180/65.4 |
| 2007/0158121 | A1 * | 7/2007 | Sato | 180/65.3 |
| 2008/0032162 | A1 | 2/2008 | Hirakata | |
| 2009/0027007 | A1 * | 1/2009 | Iwane et al. | 320/129 |
| 2009/0039815 | A1 * | 2/2009 | Fujino et al. | 318/440 |
| 2010/0258369 | A1 * | 10/2010 | Ranier et al. | 180/65.29 |
| 2010/0295513 | A1 * | 11/2010 | McCollum et al. | 320/134 |

FOREIGN PATENT DOCUMENTS

| | | |
|---|---|---|
| JP | 9-284902 | 10/1997 |
| JP | 2002-112408 | 4/2002 |
| JP | 2002-264629 | 9/2002 |
| JP | 2003-518357 | 6/2003 |
| JP | 2003-187841 | 7/2003 |
| JP | 2005-94914 | 4/2005 |
| JP | 2005-269823 | 9/2005 |
| JP | 2006-114364 | 4/2006 |

OTHER PUBLICATIONS

Japanese Office Action for Application No. 2008-065588, dated Jan. 19, 2010.
Japanese Office Action for Application No. 2008-065588, dated Apr. 6, 2010.

* cited by examiner

*Primary Examiner* — Edward Tso
*Assistant Examiner* — Samuel Berhanu
(74) *Attorney, Agent, or Firm* — Nelson Mullins Riley & Scarborough LLP; Anthony A. Laurentano

(57) ABSTRACT

A method protects a battery in a fuel cell vehicle, in which an inverter-driven motor is supplied with electric power from the battery and a fuel cell. If a battery voltage of the battery falls outside of a prescribed range, a primary current and a secondary current that flow through the DC/DC converter, or currents in branch paths that correspond to the primary current and the secondary current, are reduced in order to limit a charging current flowing into the battery or a discharging current flowing from the battery.

12 Claims, 12 Drawing Sheets

METHOD OF PROTECTING ELECTRICITY STORAGE DEVICE IN HYBRID DC POWER SUPPLY SYSTEM

BACKGROUND OF THE INVENTION

1. Field of the Invention

The present invention relates to a method of protecting an electricity storage device in a hybrid DC power supply system, which supplies electric power from two DC power supply devices to a load, e.g., a hybrid DC power supply system applied to a fuel cell vehicle, wherein electric power is supplied from a battery and a fuel cell to an inverter-driven motor.

2. Description of the Related Art

Heretofore, there has been proposed an electric vehicle in which a vehicle propelling motor (electric motor) is energized by a battery (see, Japanese Laid-Open Patent Publication No. 09-284902).

A fuse is connected to an output terminal of the battery. When an overcurrent flows from the battery, a fuse is blown immediately in order to prevent the overcurrent from flowing from the battery, thereby protecting the battery.

When the fuse is blown, the battery is unable to supply electric power until the fuse is replaced with a new one. As a result, in the meantime, the electric vehicle cannot be used.

It also is known in the art that an excessive charging current or discharging current should not flow through the battery, in order to prevent the battery from becoming unduly deteriorated.

SUMMARY OF THE INVENTION

It is an object of the present invention to provide a method of protecting an electricity storage device in a hybrid DC power supply system, by preventing an excessive charging current or discharging current from flowing through the electricity storage device.

Another object of the present invention is to provide a method of protecting an electricity storage device in a hybrid DC power supply system, by preventing a fuse connected to the electricity storage device from being blown by an overcurrent, and also by preventing an excessive charging current or discharging current from flowing through the electricity storage device.

According to the present invention, there is provided a method of protecting an electricity storage device in a hybrid DC power supply system, which includes an electric power generating device and a DC/DC converter, the electricity storage device being connected to the electric power generating device through the DC/DC converter, comprising the steps of controlling a voltage of the electric power generating device through the DC/DC converter, monitoring whether a voltage of the electricity storage device falls outside of a prescribed range or not while the voltage of the electric power generating device is being controlled, and if the voltage of the electricity storage device falls outside of the prescribed range, interrupting the step of controlling the voltage of the electric power generating device, and controlling a current passing through the DC/DC converter to track a passing current limit value, for thereby protecting the electricity storage device.

If the voltage of the electricity storage device falls outside of the prescribed range while controlling the voltage generated by the electric power generating device through the DC/DC converter, the step of controlling the voltage of the electric power generating device is interrupted, and the current passing through the DC/DC converter is reduced in order to limit the current flowing into the electricity storage device or the current flowing out of the electricity storage device, to thereby protect the electricity storage device.

Since the current flowing into the electricity storage device or the current flowing out of the electricity storage device is limited, the electricity storage device is protected, and a fuse connected in series to the electricity storage device is prevented from being blown.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An electric vehicle according to an embodiment of the present invention, which incorporates a hybrid DC power supply system that carries out a method for protecting an electricity storage device according to the present invention, will be described below with reference to the drawings.

Figure 1:
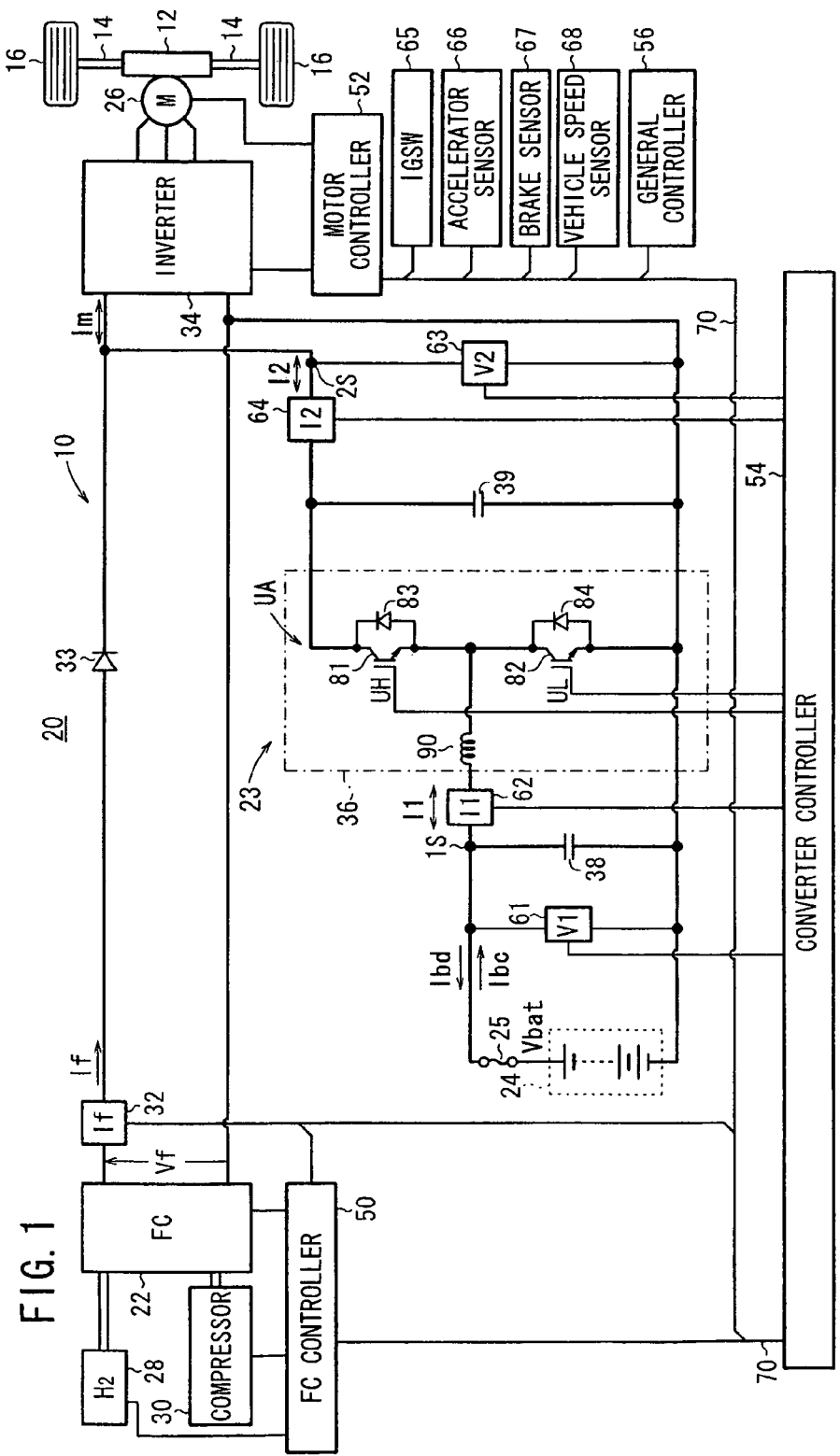
FIG. 1 is a circuit diagram, partly in block form, of a fuel cell vehicle according to an embodiment of the present invention.

FIG. 1 is a circuit diagram, partly in block form, of a fuel cell vehicle 20, which operates as an electric vehicle according to an embodiment of the present invention.

As shown in FIG. 1, the fuel cell vehicle 20 basically comprises a hybrid power supply system (hybrid DC power supply system) 10 including a fuel cell (FC) 22 functioning as an electric power generating device and an electricity storage device (referred to as a "battery") 24, which is an energy storage, a travel motor 26 forming a load that is supplied with a current (electric power) from the hybrid DC power supply system 10 through an inverter 34, and a DC/DC converter apparatus (also referred to as a "VCU (Voltage Control Unit)") 23 for converting voltages between a primary end 1S connected to the battery 24 and a secondary end 2S connected to the fuel cell 22 and the motor 26 (the inverter 34).

The VCU 23 comprises a DC/DC converter 36, and a converter controller 54 that serves as a controller (control device) for energizing switching devices of the DC/DC converter 36.

Rotation of the motor 26 is transmitted through a speed reducer 12 and shafts 14 to wheels 16, thereby rotating the wheels 16.

The fuel cell 22 comprises a stacked structure made up of cells, each of which includes an anode electrode, a cathode electrode, and a solid-state polymer electrolytic membrane sandwiched between the anode and cathode electrodes. The fuel cell 22 is connected to a hydrogen tank 28 and an air compressor 30 by pipes. The fuel cell 22 generates a current If due to an electrochemical reaction between a hydrogen reaction gas (fuel gas) and air (oxidizer gas). The generated current If is supplied through a current sensor 32 and a diode (also referred to as a "disconnecting diode") 33 to the inverter 34 and/or the DC/DC converter 36. The fuel cell 22 generates a voltage Vf.

The inverter 34 converts the direct current If into an alternating motor current Im, which is supplied to the motor 26 that operates in a propulsive power mode. The inverter 34 also converts an alternating motor current generated when the motor 26 operates in a regenerative mode into a direct motor current Im, which is supplied from the secondary end 2S to the primary end 1S through the DC/DC converter 36.

A secondary voltage V2, which may be the regenerated voltage in the regenerative mode or the generated voltage Vf across the fuel cell 22, is converted into a low primary voltage V1 by the DC/DC converter 36. Under the low primary voltage V1, a charging current Ibc flows into the battery 24.

The battery 24, which is connected to the primary end 1S, may comprise a lithium ion secondary battery, or a capacitor. In the present embodiment, the battery 24 comprises a lithium ion secondary battery.

The battery 24 delivers a discharging current Ibd in order to supply the motor current Im to the inverter 34 through the DC/DC converter 36.

A fuse 25 for protecting the battery 24 against short-circuiting is connected in series to a positive output terminal of the battery 24. If a short circuit is formed between a line connected to the negative terminal of the battery 24 and a line connected to the positive terminal of the battery 24, which is connected to the primary end 1S, then the fuse 25 is blown in order to protect the battery 24.

Smoothing capacitors 38, 39 are connected respectively across the primary and secondary ends 1S, 2S.

The fuel cell 22, the hydrogen tank 28, and the air compressor 30 make up a system controlled by an FC controller 50. The inverter 34 and the motor 26 make up a system controlled by a motor controller 52, which includes an inverter driver. The DC/DC converter 36 makes up a system controlled by the converter controller 54, which includes a converter driver.

The FC controller 50, the motor controller 52, and the converter controller 54 are controlled by a general controller 56, which serves as a higher-level controller for determining a total demand load Lt on the fuel cell 22, etc.

Each of the general controller 56, the FC controller 50, the motor controller 52, and the converter controller 54 comprises a CPU, a ROM, a RAM, a timer, input and output interfaces including an A/D converter, a D/A converter, and if necessary, a DSP (Digital Signal Processor), etc.

The general controller 56, the FC controller 50, the motor controller 52, and the converter controller 54 are connected to each other by communication lines 70, such as a CAN (Controller Area Network) serving as an intra-vehicular LAN, and perform various functions by sharing input and output information from various switches and sensors, and by executing programs stored in ROMs under the CPUs based on the input and output information from the various switches and sensors.

The switches and sensors for detecting states of the vehicle include, in addition to the current sensor 32 for detecting the generated current If, a voltage sensor 61 for detecting a primary voltage V1 equal to the battery voltage Vbat, a current sensor 62 for detecting a primary current I1 equal to a battery current Ib (discharging current Ibd or charging current Ibc), a voltage sensor 63 for detecting the secondary voltage V2 equal to the generated voltage Vf across the fuel cell 22 when the disconnecting diode 33 is rendered conductive, a current sensor 64 for detecting the secondary current I2, an ignition switch (IGSW) 65, an accelerator sensor 66, a brake sensor 67, and a vehicle speed sensor 68, etc., all of which are connected to the communication lines 70.

The general controller 56 determines a total demand load Lt on the fuel cell vehicle 20 based on the state of the fuel cell 22, the state of the battery 24, the state of the motor 26, the state of accessories (not shown), and the input signals from the switches and sensors (load demands), determines shares of a fuel cell allocated load (demand output) Lf to be allocated to the fuel cell 22, a battery allocated load (demand output) Lb to be allocated to the battery 24, and a regenerative power supply allocated load (demand output) Lr to be allocated to the regenerative power supply, through an arbitration process based on the total demand load Lt, and sends commands indicative of the determined shares to the FC controller 50, the motor controller 52, and the converter controller 54.

The DC/DC converter 36 comprises a phase arm (single-phase arm) UA disposed between the battery 24 and the fuel cell 22. The phase arm UA is made up of an upper arm assembly including an upper arm switching device 81 and a diode 83, and a lower arm assembly including a lower arm switching device 82 and a diode 84.

The upper arm switching device 81 and the lower arm switching device 82 each comprises a MOSFET, an IGBT, or the like.

A single reactor 90 for discharging and storing energy at the time the DC/DC converter 36 converts between the primary voltage V1 and the secondary voltage V2 is inserted between the battery 24 and the midpoint (junction) of the phase arm UA.

The upper arm switching device 81 is turned on by a gate drive signal (drive voltage) UH, which is output from the converter controller 54 when the gate drive signal UH is high in level. The lower arm switching device 82 is turned on by a gate drive signal (drive voltage) UL, which is output from the converter controller 54 when the gate drive signal UL is high in level.

Figure 2:
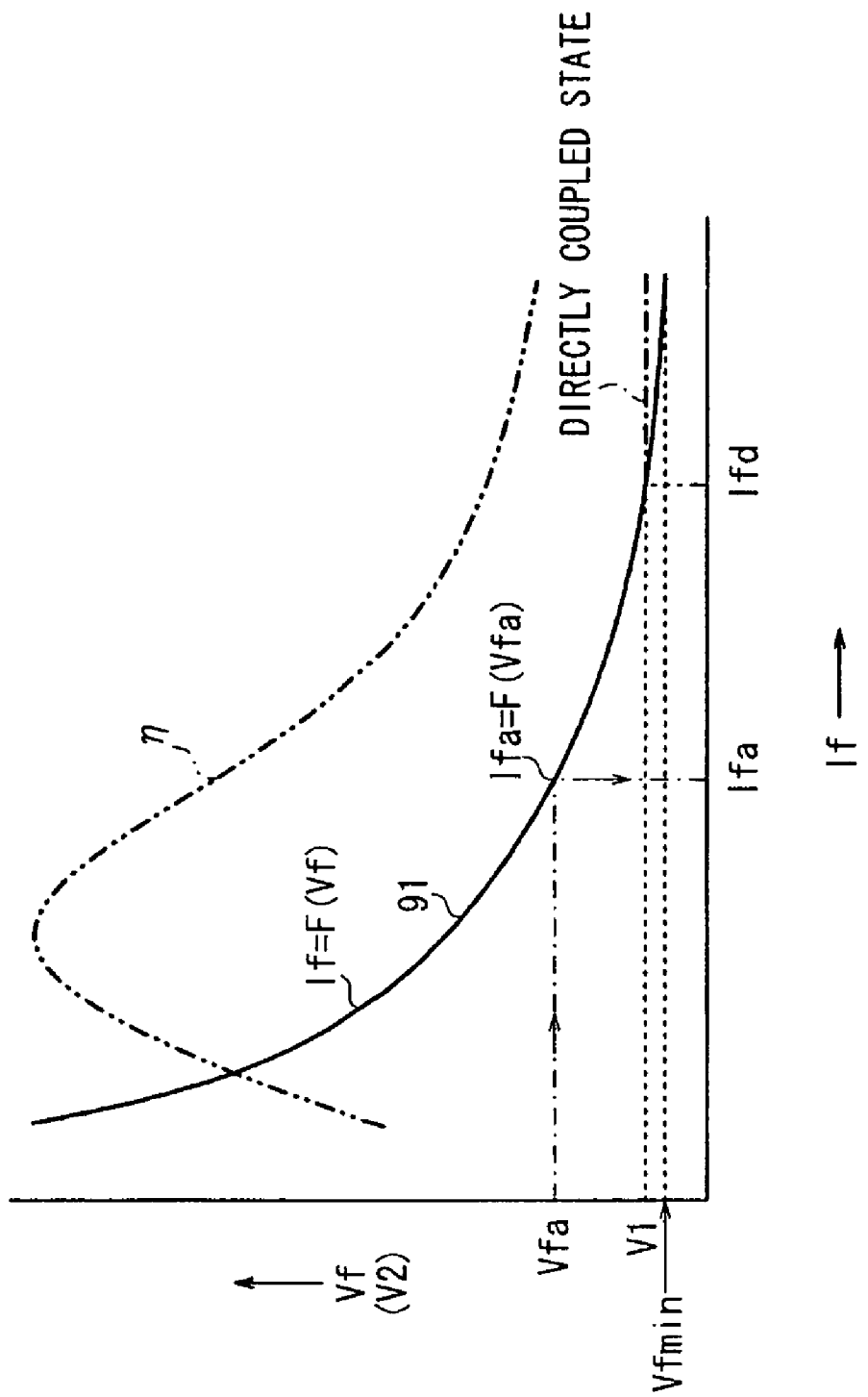
FIG. 2 is a diagram showing a current-voltage characteristic of a fuel cell.

The primary voltage V1, typically the open circuit voltage OCV (Open Circuit Voltage) across the battery 24 at a time when a load is not connected to the battery 24, is set to a voltage higher than the minimum voltage Vfmin of the generated voltage Vf of the fuel cell 22, as indicated by the fuel cell output characteristic curve (current-voltage characteristic curve) 91 shown in FIG. 2. In FIG. 2, OCV≈V1.

The secondary voltage V2 is equal to the generated voltage Vf of the fuel cell 22 while the fuel cell 22 generates electric power.

When the generated voltage Vf of the fuel cell 22 becomes equal to the voltage Vbat (=V1) of the battery 24, the fuel cell 22 and the battery 24 are in a directly coupled state, as indicated by the thick dot-and-dash line in FIG. 2.

In such a directly coupled state, the duty ratio of the gate drive signal UH supplied to the upper arm switching device 81 is 100%, for example, whereas the duty ratio of the gate drive signal UL supplied to the lower arm switching device 82 is 0%, for example. In the directly coupled state, when current flows from the secondary end 2S to the primary end 1S in a charging direction (regenerative mode direction), the current flows through the upper arm switching device 81. When current flows from the primary end 1S to the secondary end 2S in a propulsive power mode direction, the current flows through the diode 83.

In the directly coupled state, the DC/DC converter 36 does not convert voltages. Strictly speaking, since the lower arm switching device 82 is not actually turned on unless the lower arm switching device 82 becomes energized for a time period longer than a minimum ON time, the directly coupled state is reached before the duty ratio of the gate drive signal UL becomes 0% (or the duty ratio of the gate drive signal UH becomes 100%) if the lower arm switching device 82 is energized for a time shorter than the minimum ON time. For easier understanding, it is assumed that in the directly coupled state, the duty ratio of the gate drive signal UH for the upper arm switching device 81 is 100%, whereas the duty ratio of the gate drive signal UL for the lower arm switching device 82 is 0%.

The output control process performed on the fuel cell 22 by the VCU 23, i.e., a secondary voltage V2 control process, will be described below.

When the fuel cell 22 generates electric power while the fuel cell 22 is being supplied with fuel gas from the hydrogen tank 28 and compressed air from the air compressor 30, the generated current If of the fuel cell 22 is determined by the converter controller 54 as a result of setting the secondary voltage V2, i.e., the generated voltage Vf, through the DC/DC converter 36 on the characteristic curve 91, also referred to as "function F(Vf)", as shown in FIG. 2. The generated current If is determined as a function F(Vf) value of the generated voltage Vf. Since If=F(Vf), if the generated voltage Vf is set to Vf=Vfa=V2, the generated current Ifa is determined as a function of the generated voltage Vfa(V2) according to the equation Ifa=F(Vfa)=F(V2).

Specifically, when the generated voltage Vf serving as a second output voltage from the fuel cell 22 decreases, the generated current If flowing from the fuel cell 22 increases. Conversely, when the generated voltage Vf increases, the generated current If decreases.

Inasmuch as the generated current If of the fuel cell 22 is determined when the secondary voltage V2 (the generated voltage Vf) is determined, the secondary voltage V2 (the generated voltage Vf) at the secondary end 2S of the DC/DC converter 36 is normally set to a target voltage (target value), for enabling the feedback control process to be performed by the VCU 23 including the converter controller 54, in the system including the fuel cell 22, such as the fuel cell vehicle 20. In other words, the VCU 23 controls the output (generated current If) of the fuel cell 22. The output control process performed on the fuel cell 22 by the VCU 23 has been described above.

In order to protect the battery 24 by limiting the charging and discharging currents thereof, while also preventing the fuse 25 from being blown, the output control process performed on the fuel cell 22 by the VCU 23 is interrupted, and the current that flows through the DC/DC converter 36, i.e., the secondary current I2 or the primary current I1 in the present embodiment, is controlled. The VCU 23 also is capable of controlling the primary voltage V1.

A process of controlling the primary current I1 to control the current flowing through the DC/DC converter 36, i.e., to limit the current flowing through the DC/DC converter 36, will be described below.

Figure 3:
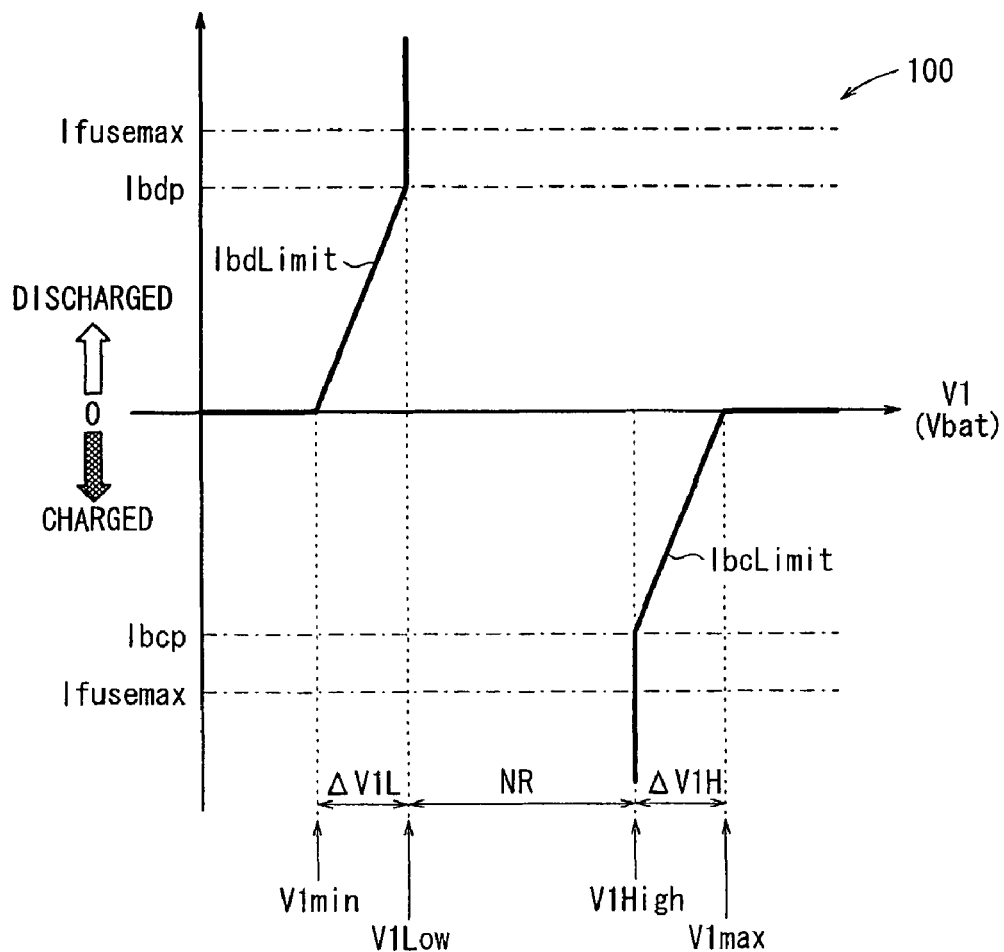
FIG. 3 is a diagram showing a battery current limit table.
Figure 4:
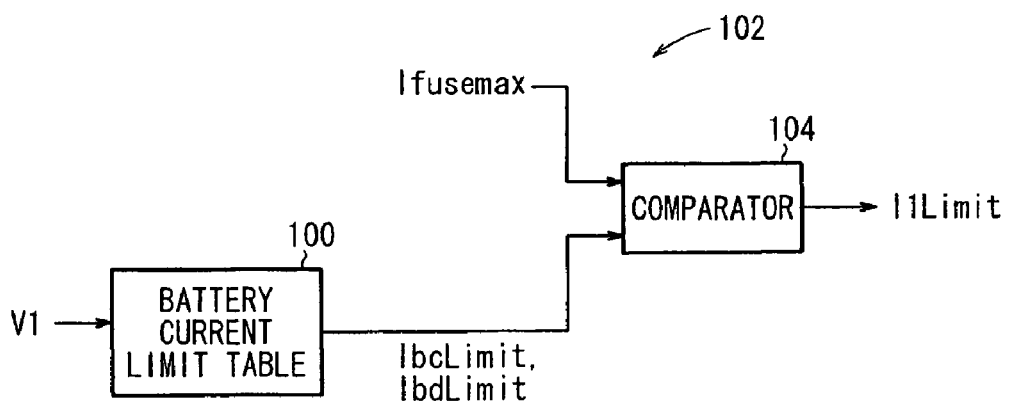
FIG. 4 is a block diagram of a current limit value selector, which operates as a function of a converter controller shown in FIG. 1.

The primary current I1 of the DC/DC converter 36 is limited based on a battery current limit table 100, as shown in FIG. 3, which is stored in a memory of the converter controller 54, and also based on a current limit value selector 102, as shown in FIG. 4, which provides a current limiting function of the converter controller 54.

In the present embodiment, the primary current I1 is directly controlled or limited for the purpose of protecting the battery 24 and preventing the fuse 25 from being blown. However, the primary current I1 may indirectly be controlled or limited, by limiting the current flowing through any one of the branch lines of the DC/DC converter 36, e.g., the secondary current I2 flowing through the current sensor 64, the current flowing through the upper arm switching device 81, the current flowing through the lower arm switching device 82, or the current flowing through the capacitor 39.

In FIG. 3, as long as the primary voltage V1 detected by the voltage sensor 61, i.e., the battery voltage Vbat, remains within a prescribed range (normal voltage range, ordinary operating voltage range) NR between a set battery voltage lower limit value V1Low and a set battery voltage higher limit value V1High, the DC/DC converter 36 of the VCU 23 controls the secondary voltage V2, which is the generated voltage Vf (V2 voltage control mode). The prescribed range NR has a midpoint voltage, which is set to the open circuit voltage OCV of the battery 24, for example.

If the charging current Ibc increases to such an extent that the battery voltage Vbat rises outside of the prescribed range NR and exceeds a set battery voltage higher limit value V1High, then, as indicated by the gradient of a charging current limit value (charging current upper limit value) IbcLimit in FIG. 3, the charging current limit value IbcLimit is gradually reduced from an allowable charging current value Ibcp, while the battery voltage Vbat increases up to a primary voltage allowable maximum value V1max, within an upper-limit voltage range ΔV1H for the battery voltage Vbat. When the battery voltage Vbat becomes higher than the primary voltage allowable maximum value V1max, the charging current limit value IbcLimit is nil (i.e., no charging current Ibc flows into the battery 24).

On the other hand, if the discharging current Ibd increases to such an extent that the battery voltage Vbat falls outside of the prescribed range NR and becomes lower than the set battery voltage lower limit value V1Low, then, as indicated by the gradient of the discharging current limit value (discharging current upper limit value) IbdLimit in FIG. 3, the discharging current limit value IbdLimit gradually is reduced from an allowable discharging current value Ibdp, while the battery voltage Vbat decreases down to a primary voltage allowable minimum value V1min, within a lower-limit voltage range ΔV1L for the battery voltage Vbat. When the battery voltage Vbat becomes lower than the primary voltage allowable minimum value V1min, the discharging current limit value IbdLimit is nil (i.e., no discharging current Ibd flows from the battery 24).

In FIG. 3, the range from the primary voltage allowable minimum value V1min to the primary voltage allowable maximum value V1max serves as a voltage range for keeping the battery 24 in a non-deteriorated condition.

The battery current limit table 100 also includes a fuse current limit value Ifusemax, at which the fuse is prevented from blowing.

As shown in FIG. 4, the current limit value selector 102 refers to the battery current limit table 100, based on the primary voltage V1. When the charging current limit value IbcLimit or the discharging current limit value IbdLimit is detected, a comparator 104 of the current limit value selector 102 compares either the charging current limit value IbcLimit or the discharging current limit value IbdLimit with the fuse current limit value Ifusemax for preventing the fuse from being blown, and sets the primary current limit value I1Limit to a smaller value.

In the battery current limit table 100 shown in FIG. 3, the charging current limit value IbcLimit or the discharging current limit value IbdLimit, which is smaller than the fuse current limit value Ifusemax, is set as the primary current limit value I1Limit. With the primary current limit value I1Limit being thus set, the battery 24 can be protected, and blowing of the fuse 25 is prevented.

Specific values for the voltages and currents are indicated below. When the open circuit voltage OCV is selected to be of a value in a range from 200 [V] to 500 [V], the lower-limit voltage range $\Delta$V1L and the upper-limit voltage range $\Delta$V1H are set to a range from 10 [V] to 25 [V], and the allowable charging current value Ibcp and the allowable discharging current value Ibdp are set to values in a range from 200 [A] to 500 [A].

If the battery voltage Vbat goes outside of the prescribed range NR (V1Low$\leqq$Vbat$\leqq$V1High), then the converter controller 54 performs a primary current feedback control process for the DC/DC converter 36, in order for the primary current I1 to track the primary current limit value I1Limit (the charging current limit value IbcLimit or the discharging current limit value IbdLimit). The primary current feedback control process comprises a PI control process or a PID control process.

Basic operations of the DC/DC converter 36, which is controlled by the converter controller 54, will be described below with reference to FIG. 5.

As described above, the general controller 56 determines a total demand load Lt on the fuel cell vehicle 20 based on the state of the fuel cell 22, the state of the battery 24, the state of the motor 26, the state of various accessories (not shown), and input signals from the switches and sensors (load demands). The general controller 56 then determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt. The general controller 56 sends commands indicative of the determined shares to the FC controller 50, the motor controller 52, and the converter controller 54.

Figure 5:
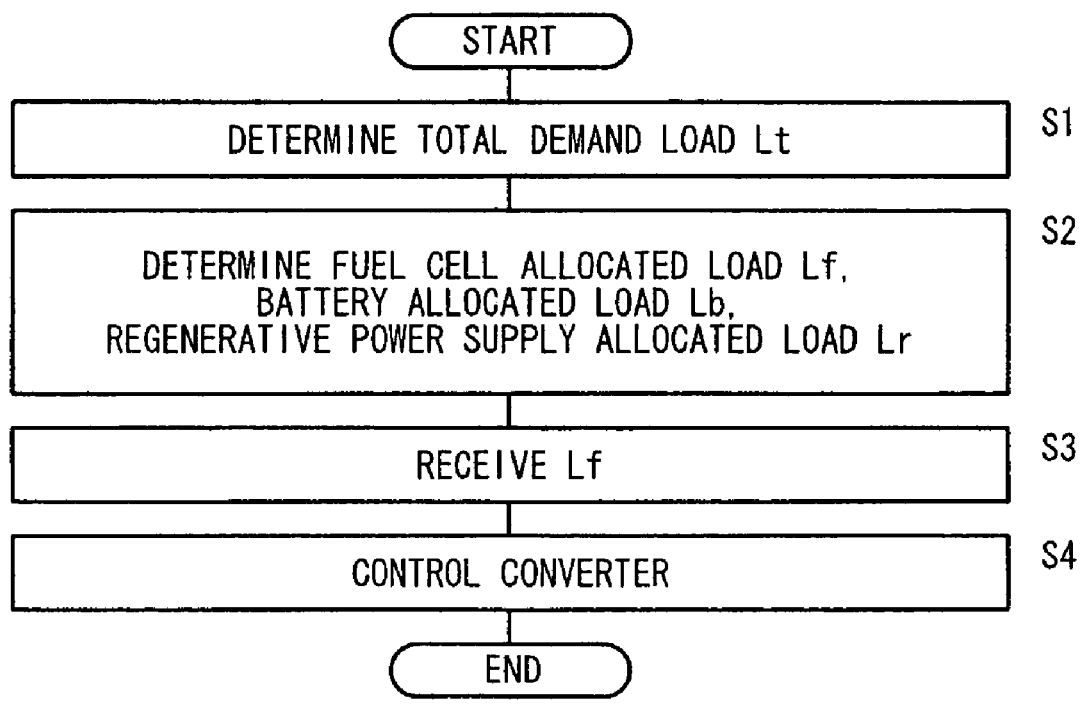
FIG. 5 is a flowchart of a basic control sequence of a DC/DC converter controlled by the converter controller.

In step S1 shown in FIG. 5, the general controller 56 determines (calculates) a total demand load Lt from the power demand of the motor 26, the power demand of accessories, and the power demand of the air compressor 30, all of which represent load demands. In step S2, the general controller 56 determines the shares of a fuel cell allocated load Lf, a battery allocated load Lb, and a regenerative power supply allocated load Lr, for outputting the determined total demand load Lt, and sends commands indicative of the determined shares to the FC controller 50, the motor controller 52, and the converter controller 54. When the general controller 56 determines the fuel cell allocated load Lf, the general controller 56 takes the efficiency $\eta$ of the fuel cell 22 into account.

Next, in step S3, the fuel cell allocated load Lf (essentially including a command voltage V2com for the generated voltage Vf to be directed to the converter controller 54) as determined by the general controller 56 is transmitted as a command through the communication lines 70 to the converter controller 54. In response to the command of the fuel cell allocated load Lf, the converter controller 54 controls duty ratios for driving the upper and lower arm switching devices 81, 82 of the DC/DC converter 36, i.e., the on-duty ratios of the gate drive signals UH, UL, in order to bring the secondary voltage V2, i.e., the generated voltage Vf of the fuel cell 22, into conformity with the command voltage V2com from the general controller 56.

The secondary voltage V2 (or the primary voltage V1) is controlled by the converter controller 54 while the converter controller 54 also controls the DC/DC converter 36 in the PID operation, based on a combination of a feed-forward control process and a feedback control process.

In response to commands from the general controller 56, the FC controller 50 and the motor controller 52 also perform respective processing sequences.

The FC controller 50, the converter controller 54, and the motor controller 52 report results of their respective control processes to the general controller 56, from time to time.

So that the fuel cell vehicle 20 can smoothly respond to the user's actions, such as an action on the accelerator pedal, without causing the user to feel strange or uncomfortable, the general controller 56 may include a processing period, which is longer than the processing period of the converter controller 54, the switching period of which is about 50 $\mu$S. For example, the processing period of the general controller 56 may be set to a value in a range from 1 to 1000 mS, whereas the processing period of the converter controller 54 is set to a value in a range from 1 to 1000 $\mu$S, for example.

The converter controller 54 energizes the DC/DC converter 36 in a voltage increasing mode or a voltage reducing mode, as described below.

Figure 6:
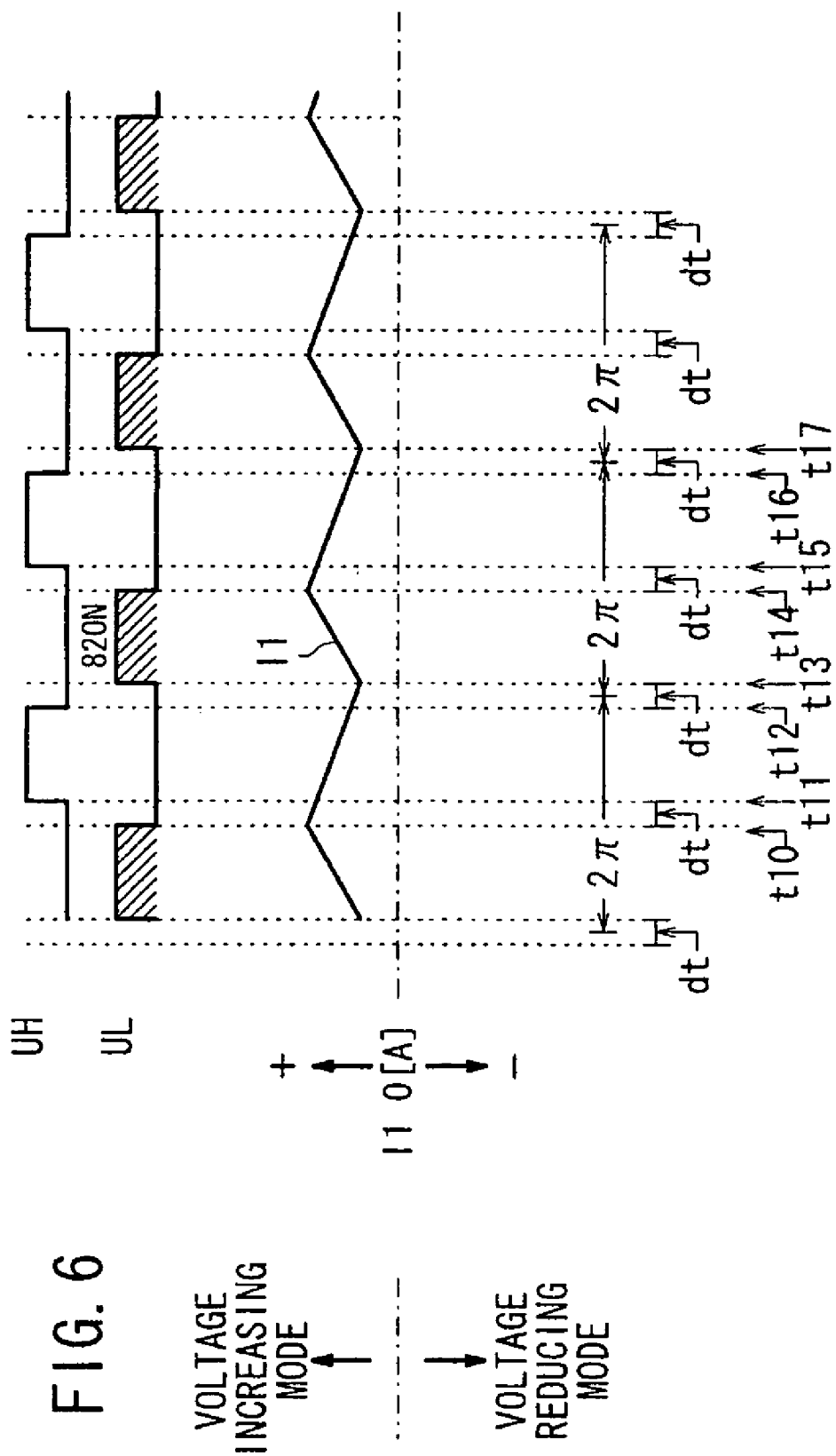
FIG. 6 is a timing chart of a voltage increasing mode of the DC/DC converter.

In the voltage increasing mode, for causing the secondary current I2 to flow from the secondary end 2S of the DC/DC converter 36 to the inverter 34 in step S4, the converter controller 54 turns on the lower arm switching device 82 at time t13, for example, as shown in FIG. 6. Energy is stored in the reactor 90 due to the discharging current Ibd from the battery 24 between time t13 and time t14, and the secondary current I2 flows from the capacitor 39 to the inverter 34.

Then, the converter controller 54 turns off the lower arm switching device 82 at time t14. The energy stored in the reactor 90 at time t14 flows as the primary current I1 (discharging current Ibd) through the diode 83, thereby storing energy in the capacitor 39, while also flowing as the secondary current I2 into the inverter 34.

From time t17, the operation after time t13 is repeated. The lower arm switching device 82 and the upper arm switching device 81 are switched, alternately or synchronously, once within a period of 2$\pi$ (50 $\mu$S), with a dead time dt being inserted therein. In the voltage increasing mode, the upper arm switching device 81 is not turned on. The drive duty ratio (on duty ratio) of the lower arm switching device 82 is determined so as to maintain the output voltage V2 in conformity with the command voltage Vcom.

In a directly coupled mode, the voltage increasing mode (chopping mode, voltage converting mode), which causes the discharging current Ibd of the battery 24 to flow as the secondary current I2 from the primary end 1S of the DC/DC converter 36 to the inverter 34 via the secondary end 2S, is not carried out, and the discharging current Ibd (the primary current I1) flows through the diode 83 as the secondary current I2 to the inverter 34. In this case, the secondary voltage V2 is represented by V2=V1−Vd, where Vd represents a forward voltage drop across the diode 83. In the directly coupled mode, the on duty ratio of the gate drive signal UH is 100%, for example, and the on duty ratio of the gate drive signal UL is 0%, for example.

Figure 7:
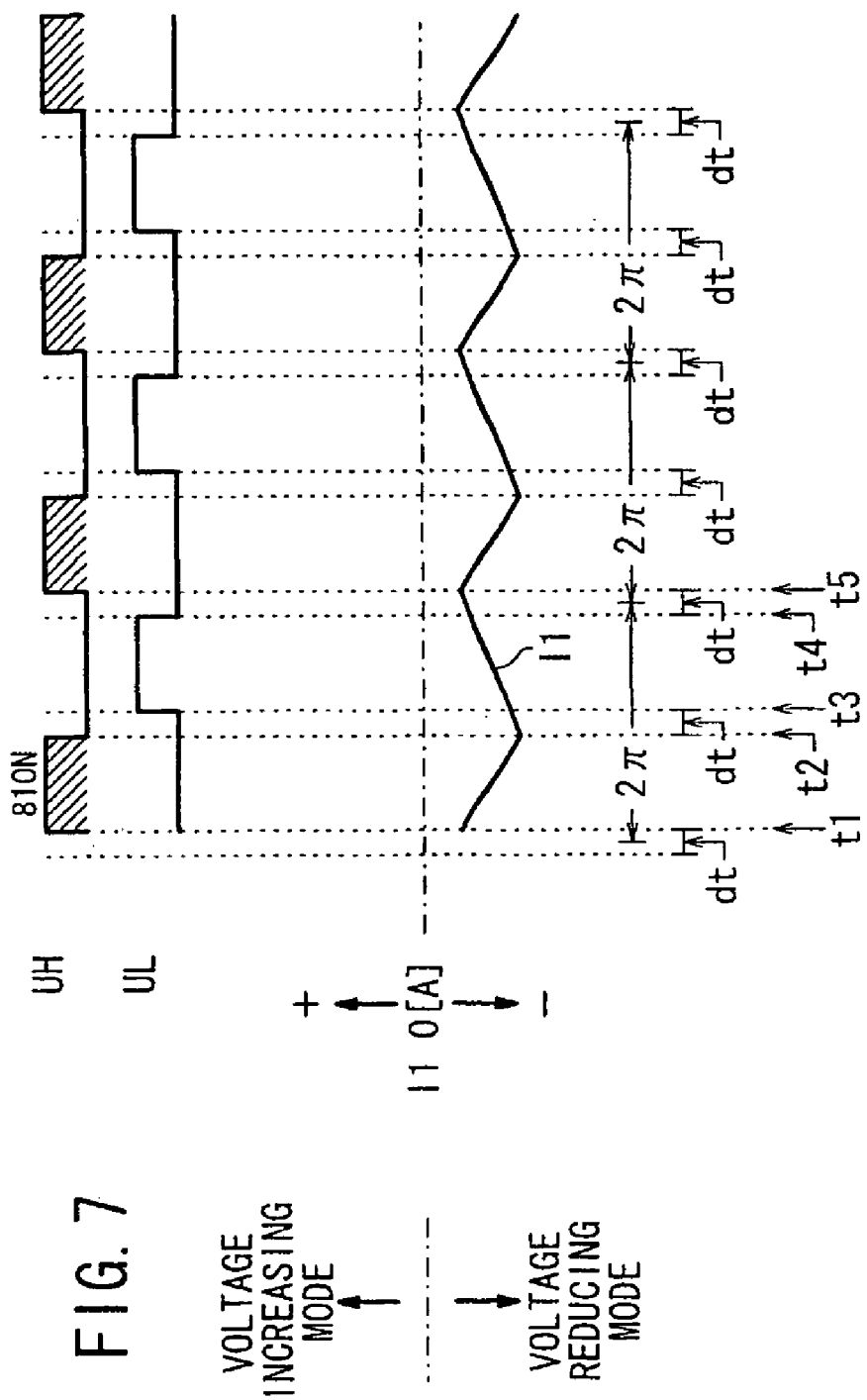
FIG. 7 is a timing chart of a voltage reducing mode of the DC/DC converter.

In the voltage reducing mode, during which current (charging current Ibc) is caused to flow from the secondary end 2S of the DC/DC converter 36 to the battery 24 connected to the primary end 1S in step S4, the converter controller 54 turns on the upper arm switching device 81 at time t1 in FIG. 7, in order to store energy in the reactor 90 with the generated current If from the fuel cell 22, the secondary current I2 due to the regenerated current from the inverter 34, and the current output from the capacitor 39, while at the same time charging the capacitor 38 and supplying the charging current Ibc to the battery 24.

When the upper arm switching device 81 is turned off at time t2, the energy stored in the reactor 90 is supplied as the charging current Ibc through a loop, including the battery 24 and the diode 84, to the battery 24. Further, the electric charges stored in the capacitor 38 are supplied as part of the charging current Ibc to the battery 24 (the capacitor 38 is discharged).

If a regenerated voltage exists in the motor 26, then a regenerated current due to the regenerative power supply allocated load Lr is added to the secondary current I2, which flows from the secondary end 2S of the DC/DC converter 36 through the DC/DC converter 36 in the voltage reducing mode. In the voltage reducing mode, the on-duty ratios of the upper arm switching device 81 and the lower arm switching device 82 also are controlled in order to maintain the secondary voltage V2 in conformity with the command voltage V2com.

In the present embodiment, during each processing period $(3 \times 2\pi)$, which is three times the switching period $2\pi$ (corresponding to the time of the reciprocal (e.g., about 1/20 kHz≈50 μS) of the switching frequency), the converter controller 54 determines an operation sequence of the DC/DC converter 36, i.e., a converter control sequence in step S4, which shall be performed during a subsequent period of $3 \times 2\pi$.

In FIGS. 6 and 7, the primary current I1 flowing through the reactor 90 has a positive (+) sign when the primary current I1 flows as the discharging current Ipd from the primary end 1S to the secondary end 2S, in the voltage increasing mode (current flows from the secondary end 2S of the DC/DC converter 36 to the inverter 34). Further, the primary current I1 has a negative sign (−) when the primary current I1 flows as the charging current Ibc from the secondary end 2S to the primary end 1S in the voltage reducing mode (current flows from the fuel cell 22 or the inverter 34 to the secondary end 2S of the DC/DC converter 36).

Among the waveforms of the gate drive signals UH, UL, which are output from the converter controller 54, periods thereof that are shown in cross-hatching represent periods in which the upper and lower arm switching devices 81, 82, which are supplied with the gate drive signals UH, UL, are actually turned on, i.e., currents flow through the upper and lower arm switching devices 81, 82. It is to be noted that even when the upper and lower arm switching devices 81, 82 are supplied with the gate drive signals UH, UL, currents do not flow through the upper and lower arm switching devices 81, 82 unless the corresponding parallel diodes 83, 84 have been turned off.

The basic operation of the DC/DC converter 36, which is controlled by the converter controller 54, has been described above.

The fuel cell vehicle 20 according to the present embodiment is basically constructed and operated as described above. An operation mode A for preventing the fuse 25 from blowing and limiting the discharging current Ibd flowing from the battery 24, and an operation mode B for preventing the fuse 25 from blowing and limiting the charging current Ibc flowing into the battery 24, will be described below.

An operation mode A for limiting the discharging current Ibd will first be described below.

Figure 8:
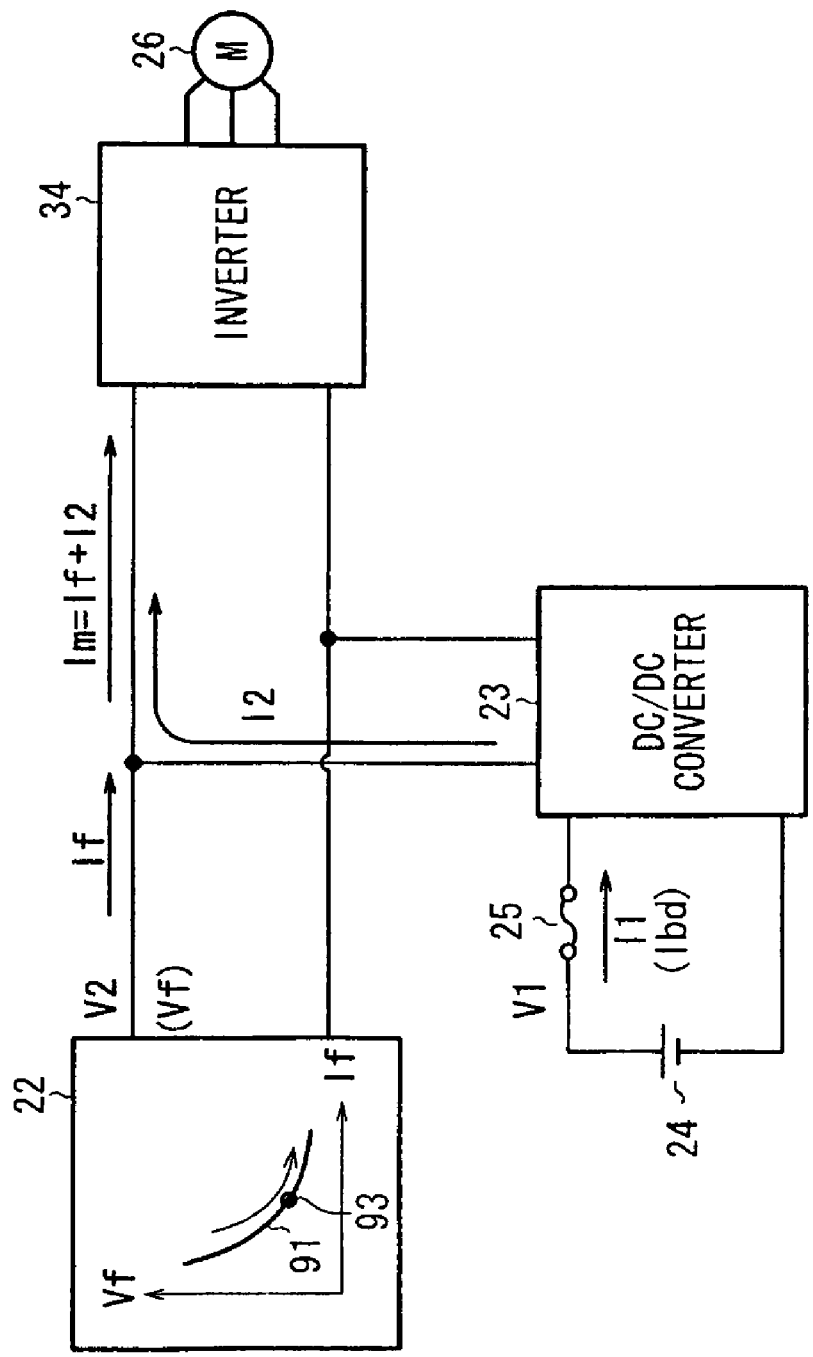
FIG. 8 is a block diagram illustrating a control process for limiting a discharging current flowing from a battery.

FIG. 8 is a block diagram illustrating the directions of currents and a process of controlling the fuel cell 22 of the fuel cell vehicle 20 during the operation mode A. In the operation mode A, the discharging current Ibd acts as an assistive current, and the motor current Im is controlled as a sum of the generated current If and the secondary current I2 (Im=If+I2). If the efficiency of the DC/DC converter 36 is taken to be 100%, for facilitating understanding of the invention, then since V1×I1=V2×I2, the motor current Im is expressed as Im=If+I2 (the current flowing from the primary end 1S to the secondary end 2S)=If+I1×(V1/V2).

Figure 9:
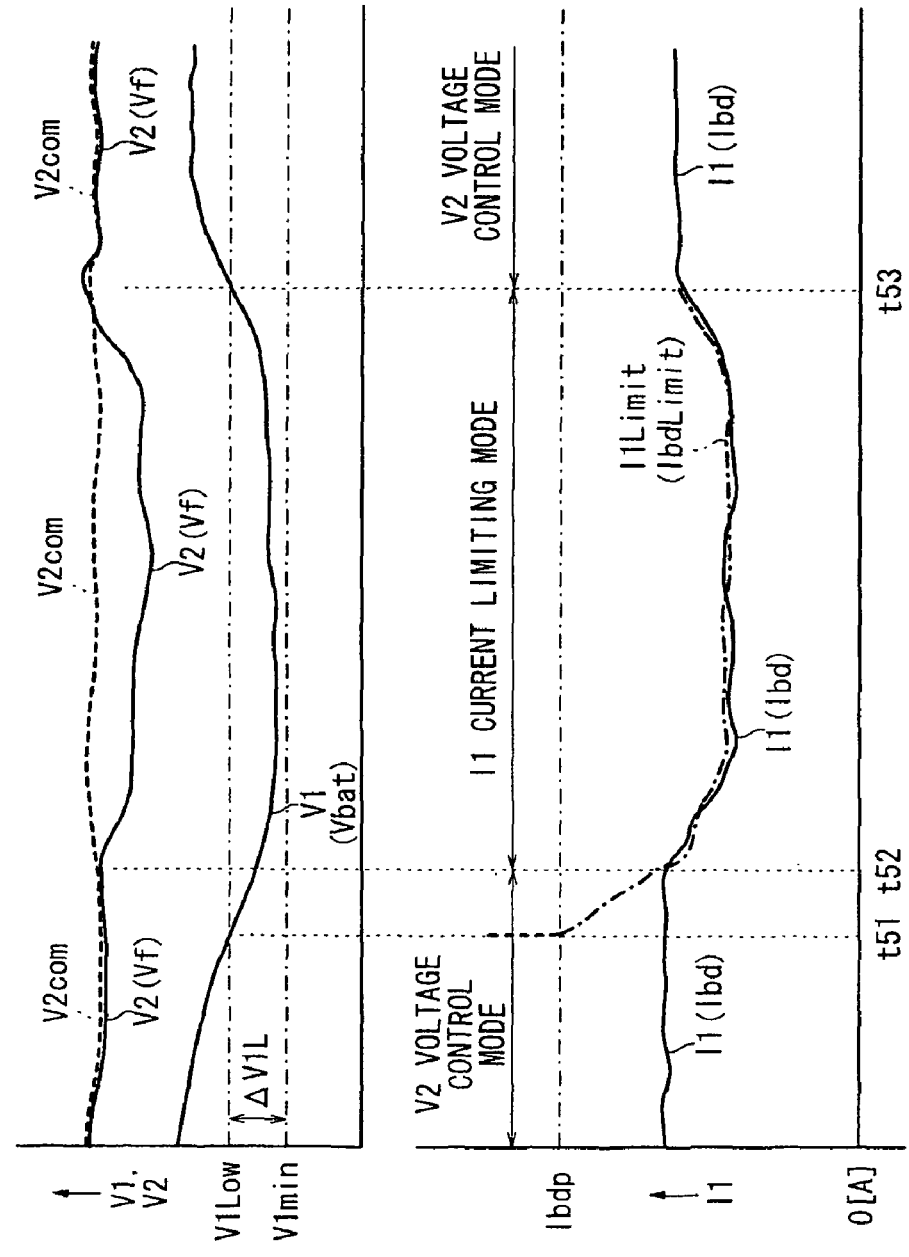
FIG. 9 is a waveform diagram illustrating a control process for limiting a discharging current.

FIG. 9 is a waveform diagram illustrating the operation mode A for limiting the discharging current Ibd.

During the period of time up to time t51 in FIG. 9, since the battery voltage Vbat (primary voltage V1) has a value that is higher than the set battery voltage lower limit value V1Low (lower limit threshold value), the battery 24 operates at a voltage within the prescribed range NR, and the discharging current Ibd does not need to be limited (reduced). In this case, the converter controller 54 controls the DC/DC converter 36 in order to bring the generated voltage Vf (the secondary voltage V2) of the fuel cell 22 into conformity with the command voltage V2com for the fuel cell 22, which is received from the general controller 56 (this mode is referred to as a V2 voltage control mode). Therefore, the generated current If is controlled by controlling the generated voltage Vf.

After the battery voltage Vbat has become lower than the battery voltage lower limit set value V1Low at time t51, and when the discharging current Ibd (primary current I1) exceeds the discharging current limit value IbdLimit at time t52, the converter controller 54 interrupts the V2 voltage control mode and enters into an I1 current limiting mode, during which the discharging current limit value IbdLimit (primary current upper limit setting value I1Limit) is used as a target value (target current).

In order to prevent the fuse 25 from blowing, the discharging current limit value IbdLimit (primary current upper limit setting value I1Limit) has a maximum value thereof limited to the fuse current limit value Ifusemax, as shown in FIG. 3.

As shown in FIG. 9, when the discharging current Ibd tracks the primary current upper limit setting value I1Limit, from time t52, the secondary voltage V2 is shifted (deviated) from the command voltage V2com.

The secondary voltage V2 at time t52 when the V2 voltage control mode is interrupted is stored as an interruption secondary voltage V2int in a non-illustrated memory of the converter controller 54.

During the period from time t52 to time t53, the converter controller 54 continues the control process in the I1 current limiting mode, for thereby bringing the discharging current Ibd (primary current I1) into conformity with the discharging current limit value IbdLimit. In other words, the converter controller 54 interrupts the V2 voltage control mode, which tracks the command voltage V2com, and performs a feedback control process based on a PI operation, as generally expressed by equation (1) shown below, which uses the discharging current limit value IbdLimit as a target current for the discharging current Ibd.

$$(Ibd-IbdLimit) \times Kp + Kif(Ibd-IbdLimit)dt \qquad (1)$$

where Ip, Ki represent proportionality coefficients.

According to the feedback control process based on the PI operation, even in the presence of disturbances, the deviation (Ibd−IbdLimit) converges to nil. In other words, the discharging current Ibd is exactly equalized to the discharging current limit value IbdLimit. Therefore, the battery 24 is protected and does not become deteriorated. Also, the fuse 25 is not blown, and saturation of the reactor 90 does not occur.

During the period from time t52 to time t53, since the command voltage V2com is not tracked, the discharging current Ibd that forms the secondary current I2 has a value limited to the discharging current limit value IbdLimit, in order to satisfy, insofar as possible, the motor current Im=If+I2, which represents a load demand determined from the accelerator opening detected by the accelerator sensor 66. Consequently, an operating point 93 on the fuel cell output characteristic curve 91, as shown in the block of the fuel cell 22 in FIG. 8, is moved in the direction of the arrow in order to increase the generated current If.

In other words, from time t52 to time t53, the duty ratios for driving the DC/DC converter 36 are controlled to shift the generated voltage Vf downwardly from the command voltage V2com, as shown in FIG. 9.

When the load demand decreases, i.e., when the motor current Im is reduced until the measured value of the secondary voltage V2, as shown by the solid-line curve, exceeds the command voltage V2com, either by a predetermined voltage or for a predetermined time, then, as indicated at time t53, the converter controller 54 decides there is no need to limit the discharging current Ipd, cancels the I1 current limiting mode, and reinstates the V2 voltage control mode. The converter controller 54 may begin to reinstate the V2 voltage control mode when the secondary voltage V2 becomes equal to the interruption secondary voltage V2int (the secondary voltage V2 at time t51 or time t52) stored in the memory.

Operation mode A has been described above.

An operation mode B, for limiting the charging current Ibc, will be described below.

Figure 10:
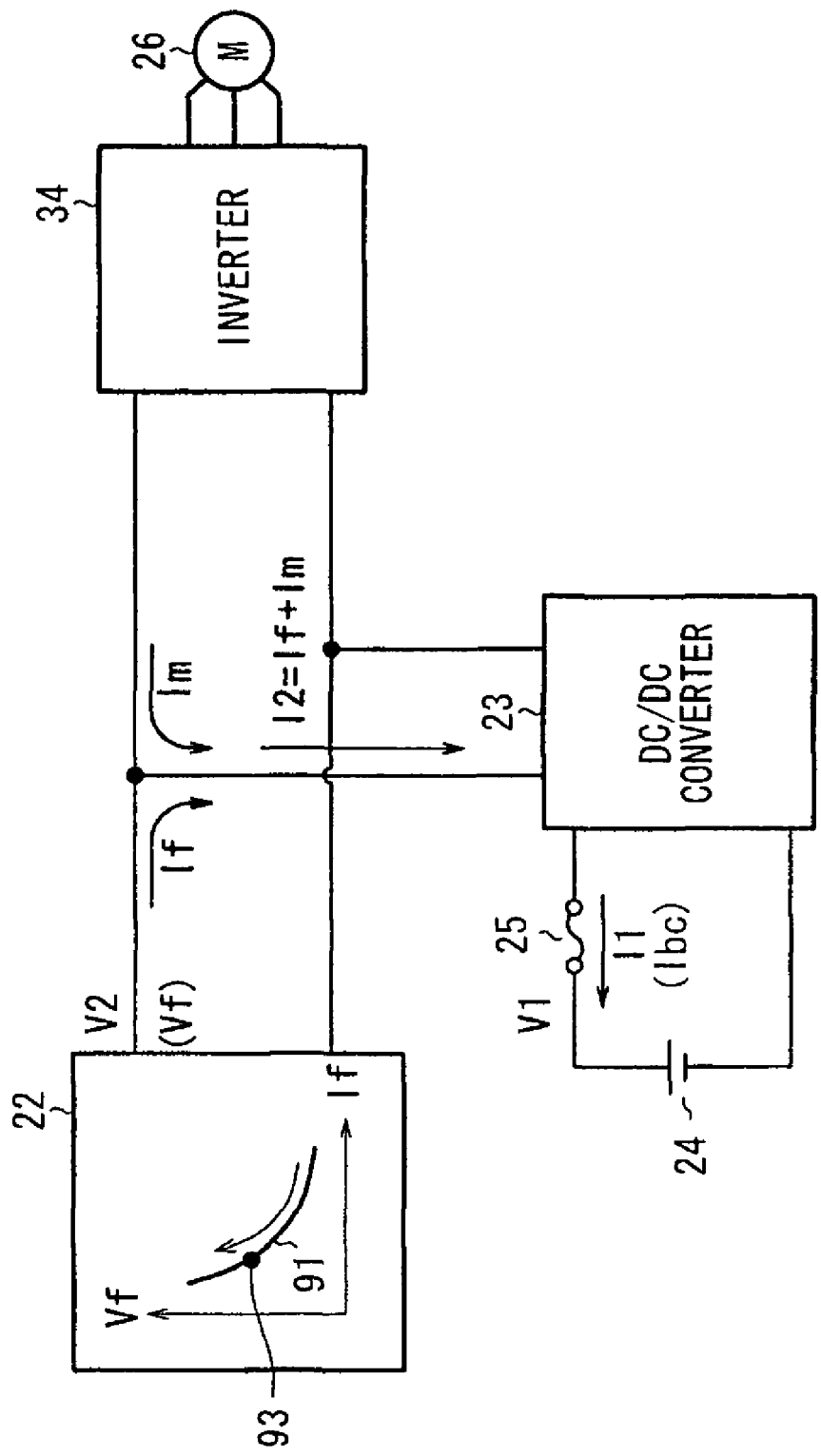
FIG. 10 is a block diagram illustrating a control process for limiting a charging current flowing into the battery.

FIG. 10 is a block diagram that illustrates the directions of currents and a process for controlling a fuel cell 22 of the fuel cell vehicle 20 during the operation mode B. In operation mode B, the charging current Ibc flowing into the battery 24 is controlled depending on the secondary current I2, which is the sum of the motor current Im as a regenerated current and the generated current If (I2=If+Im: the secondary current I2 flows from the secondary end 2S to the primary end 1S). If the efficiency of the DC/DC converter 36 is taken to be 100% for the sake of brevity, then since V1×I1=V2×I2, the charging current Ibc is expressed as Ibc=I1=I2×(V2/V1).

Figure 11:
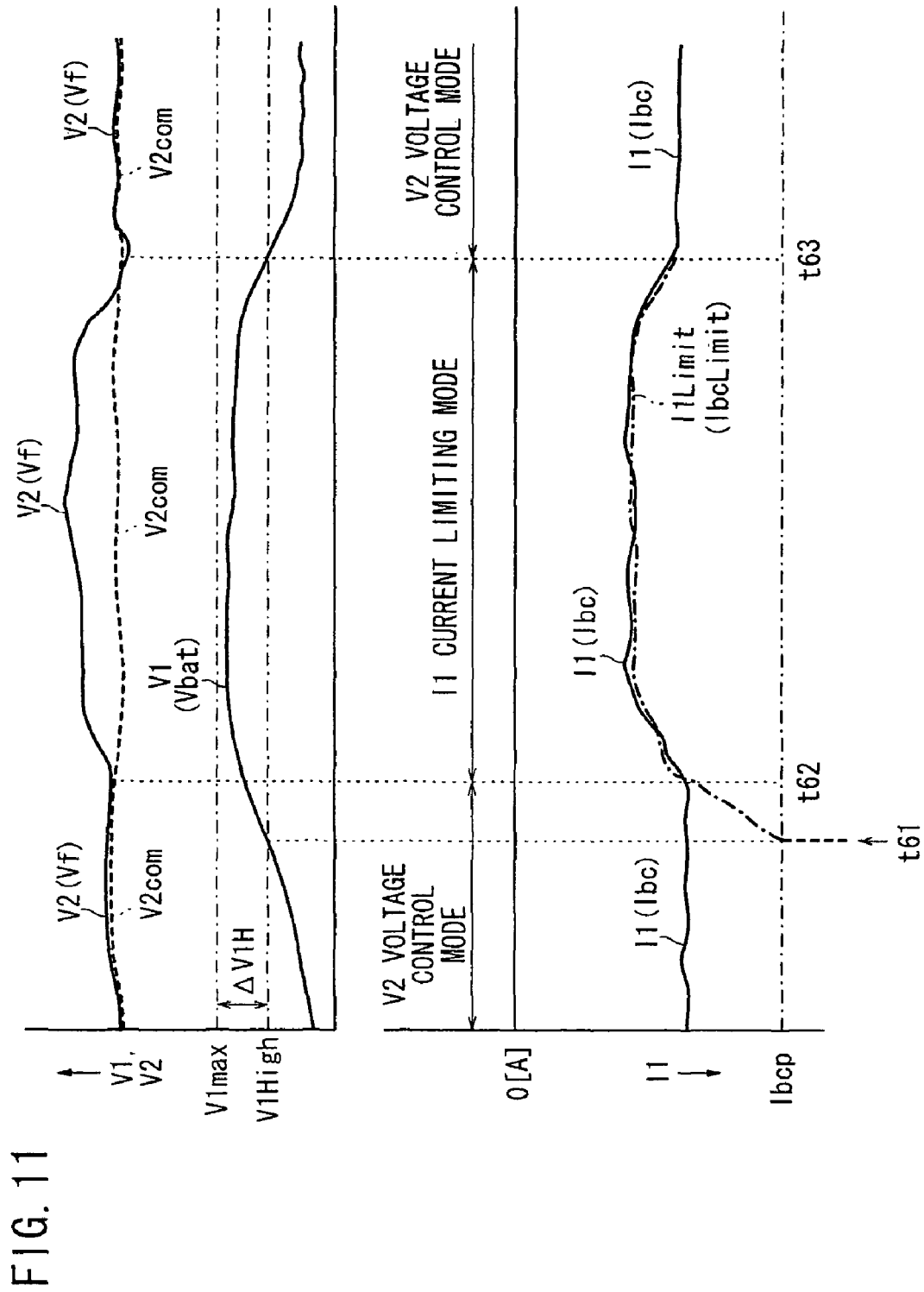
FIG. 11 is a waveform diagram illustrating a control process for limiting a charging current.

FIG. 11 is a waveform diagram that illustrates the operation mode B, for limiting the charging current Ibc.

During a period of time up to time t61 in FIG. 11, since the battery voltage Vbat (primary voltage V1) is of a value lower than the set battery voltage upper limit value V1High (upper limit threshold value), the battery 24 operates at a voltage within the prescribed range NR, and the charging current Ibd does not need to be limited (reduced). In this case, the converter controller 54 operates in the V2 voltage control mode, for controlling the DC/DC converter 36 to bring the generated voltage Vf (the secondary voltage V2) of the fuel cell 22 into conformity with the command voltage V2com for the fuel cell 22, which is received from the general controller 56. As described above, the generated current If is controlled by controlling the generated voltage Vf.

After the battery voltage Vbat has become higher than the set battery voltage upper limit value V1High at time t61, when the charging current Ibc (primary current I1) is of a value lower (i.e., has a greater absolute value) than the charging current limit value IbcLimit at time t62, the converter controller 54 interrupts the V2 voltage control mode and enters the I1 current limiting mode, in which the charging current limit value IbcLimit (primary current upper limit setting value I1Limit) is used as a target value (target current).

In order to prevent the fuse 25 from blowing, the charging current limit value IbcLimit (primary current upper limit setting value I1Limit) has a maximum value limited to the fuse current limit value Ifusemax shown in FIG. 3.

As shown in FIG. 11, when the charging current Ibc tracks the charging current limit value IbcLimit, the secondary voltage V2 is shifted (deviated) from the command voltage V2com.

The secondary voltage V2 at time t62 when the V2 voltage control mode is interrupted is stored as an interruption secondary voltage V2int in the non-illustrated memory in the converter controller 54.

During a period from time t62 to time t63, the converter controller 54 continues the control process in the I1 current limiting mode, for bringing the charging current Ibc (primary current I1) into conformity with the charging current limit value IbcLimit. In other words, the converter controller 54 interrupts the V2 voltage control mode for tracking the command voltage V2com, and performs a feedback control process based on a PI operation, as generally expressed by equation (2) shown below, which uses the charging current limit value IbcLimit as a target current for the discharging current Ibc.

$$(Ibc-IbcLimit) \times Kp + Kif(Ibc-IbcLimit)dt \qquad (2)$$

where Ip, Ki represent proportionality coefficients.

According to the feedback control process based on the PI operation, the deviation (Ibc−IbcLimit) converges to nil even in the presence of disturbances. In other words, the charging current Ibc is equalized exactly to the charging current limit value IbcLimit. Therefore, the battery 24 is protected and does not become deteriorated, the fuse 25 is not blown, and the reactor 90 does not become saturated.

During the period from time t62 to time t63, since the command voltage V2com is not tracked, when the motor current due to the regenerated current increases, an operating point 93 on the fuel cell output characteristic curve 91, as shown in the block of the fuel cell 22 in FIG. 10, is moved in the direction of the arrow in order to reduce the generated current If, which serves as the secondary current I2.

In other words, as indicated between times t62 and t63 shown in FIG. 11, the duty ratios for driving the DC/DC converter 36 are controlled in order to shift the generated voltage Vf upwardly from the command voltage V2com, as shown by the solid-line curve.

When the motor current Im due to the regenerated current is reduced, until the secondary voltage V2 shown by the solid-line curve becomes lower than the command voltage V2com, either by a predetermined voltage or for a predetermined time, then as indicated at time t62, the converter controller 54 decides there is no need to limit the charging current Ipc, cancels the I1 current limiting mode, and reinstates the V2 voltage control mode. The converter controller 54 may also begin to reinstate the V2 voltage control mode when the secondary voltage V2 becomes equal to the interruption secondary voltage V2int, which is stored in the memory.

Operation mode B has been described above.

As described above, the hybrid DC power supply system 10 according to the present embodiment includes the battery 24, which serves as an electricity storage device for generating the battery voltage Vbat as the primary voltage V1, the fuel cell 22 connected to the motor 26, which makes up a load driven by the inverter 34 and serving as the electric power generating device for generating the voltage Vf, the DC/DC converter 36 inserted (connected) between the fuel cell 22, which is connected to the motor 26 through the inverter 34 and the battery 24, and the converter controller 54 for controlling the drive duty ratios of the gate drive signals UH, UL for the DC/DC converter 36.

A method of protecting the battery 24 in a hybrid DC power supply system 10 according to the present embodiment will be described below with reference to the flowchart shown in FIG. 12.

Figure 12:
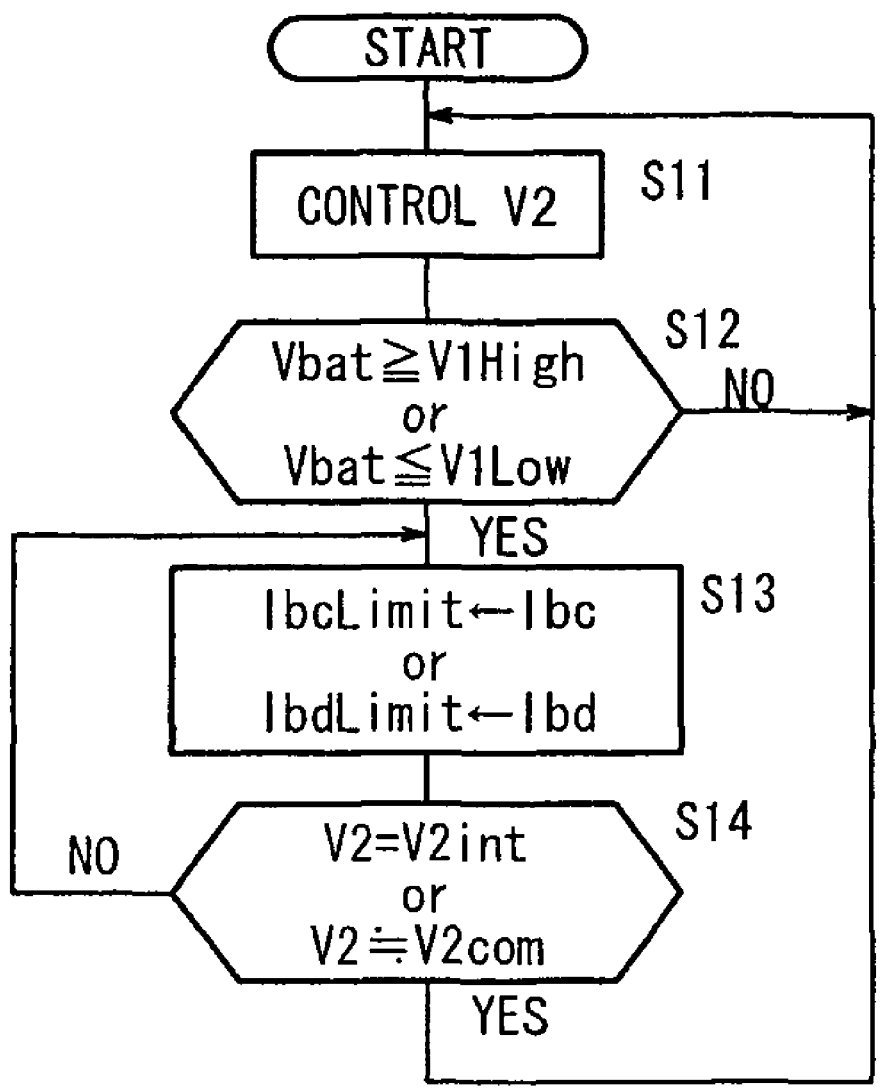
FIG. 12 is a flowchart of a sequence of a method for protecting an electricity storage device incorporated in a hybrid DC power supply system according to the present invention.

In step S11 shown in FIG. 12, the converter controller 54 controls the DC/DC converter 36 to control the secondary voltage V2, which is the voltage Vf generated by the fuel cell 22.

In step S12, while controlling the secondary voltage V2 as the voltage Vf generated by the fuel cell 22, the converter controller 54 monitors whether or not the battery voltage Vbat of the battery 24 has fallen outside of the prescribed range NR (see FIG. 3) (Vbat≧V1High or Vbat≦V1Low).

In step S13, the converter controller 54 interrupts the process of controlling the secondary voltage V2 which determines the voltage Vf generated by the fuel cell 22, until the primary voltage allowable maximum value V1max or the primary voltage allowable minimum value V1min is reached. Further, the converter controller 54 controls the charging current Ibc flowing through the DC/DC converter 36 into the battery 24 or the discharging current Ibd flowing from the battery 24 to track the primary current limit value I1Limit (i.e., the charging current limit value IbcLimit or the discharging current limit value IbdLimit) for thereby protecting the battery 24 (IbcLimit←Ibc or IbdLimit←Ibd).

More specifically, when the battery voltage Vbat of the battery 24 falls outside of the prescribed range NR, the primary current I1 and the secondary current I2 that flow through the DC/DC converter 36, or currents in branch paths that correspond to the primary current I1 and the secondary current I2, are reduced so as to limit the charging current Ibc flowing into the battery 24 or the discharging current Ibd flowing from the battery 24, thereby protecting the battery 24 from over-currents. As a result, the battery 24 is prevented from generating an excessively large or an excessively small voltage, thereby protecting the battery 24.

In step S14, the converter controller 54 returns from the I1 current limiting mode to the V2 voltage control mode (step S11), when the monitored secondary voltage V2 returns to the interruption secondary voltage V2int upon interruption of the V2 voltage control mode. In step S14, the converter controller 54 may also return from the I1 current limiting mode to the V2 voltage control mode (step S11), when the monitored secondary voltage V2 returns to the command voltage V2com received from the general controller 56. The converter controller 54 can return from the I1 current limiting mode to the V2 voltage control mode, simply by monitoring the secondary voltage V2 and the interruption secondary voltage V2int, or the secondary voltage V2 and the command voltage V2com. Accordingly, the configuration required to return from the I1 current limiting mode to the V2 voltage control mode is relatively simple.

The converter controller 54 is set to reduce the primary current limit value I1Limit depending on the voltage by which the battery voltage Vbat of the battery 24 falls outside of the prescribed range NR. Stated otherwise, the converter controller 54 reduces the primary current I1, i.e., the battery current (discharging current Ibd or charging current Ibc), depending on the magnitude of the voltage by which the battery voltage Vbat of the battery 24 falls outside of the prescribed range NR. Consequently, the battery 24 is protected more reliably.

Since the converter controller 54 controls the primary current limit value I1Limit so as not to exceed the fuse current limit value Ifusemax that prevents the fuse from blowing, the battery 24 is protected reliably. In FIG. 1, the fuse 25 is blown when the voltage sensor 61 is short-circuited thereacross.

The hybrid DC power supply system 10 may have a DC load as well as the motor 26, which is an AC load driven by the inverter 34.

The principles of the present invention are not limited to a fuel cell vehicle incorporating the hybrid DC power supply system 10, which includes the DC/DC converter 36 having the single phase arm UA, but also are applicable to fuel cell vehicles incorporating a hybrid DC power supply system, which includes a DC/DC converter having three phase arms such as U-, V-, and W-phase arms.

Although a certain preferred embodiment of the present invention has been shown and described in detail, it should be understood that various changes and modifications may be made to the embodiment without departing from the scope of the invention as set forth in the appended claims.

What is claimed is:

1. A method of protecting an electricity storage device in a hybrid DC power supply system, which includes an electric power generating device and a DC/DC converter, the electricity storage device being connected to the electric power generating device through the DC/DC converter, comprising the steps of:

controlling a voltage of the electric power generating device through the DC/DC converter so that the voltage tracks a command voltage;

monitoring whether a voltage of the electricity storage device falls outside of a prescribed range or not while the voltage of the electric power generating device is being controlled to track the command voltage;

if the voltage of the electricity storage device falls outside of the prescribed range, interrupting the step of controlling the voltage of the electric power generating device to track the command voltage, and controlling a current passing through the DC/DC converter to track a passing current limit value as a target current for protecting the electricity storage device; and monitoring the voltage of the electric power generating device and returning to the step, which has been interrupted, of controlling the voltage of the electric power generating device, depending on the monitored voltage.

2. A method according to claim 1, wherein the step of returning to the step of controlling the voltage of the electric power generating device to track the command voltage further comprises the step of:

returning to the step of controlling the voltage of the electric power generating device when the monitored voltage of the electric power generating device returns to a voltage level existing at the time the step of controlling the voltage of the electric power generating device to track the command voltage is interrupted in the step of controlling the current passing through the DC/DC converter to track the passing current limit value.

3. A method according to claim 1, wherein the step of returning to the step of controlling the voltage of the electric power generating device to track the command voltage further comprises the step of:
returning to the step of controlling the voltage of the electric power generating device to track the command voltage when the monitored voltage of the electric power generating device is of a value close to the command voltage for controlling the voltage of the electric power generating device.

4. A method according to claim 1, wherein the step of controlling the current passing through the DC/DC converter to track the passing current limit value for protecting the electricity storage device further comprises the step of: if the voltage of the electricity storage device falls outside of the prescribed range, setting the passing current limit value to a smaller value depending on the voltage of the electricity storage device that falls outside of the prescribed range.

5. A method according to claim 1, wherein the step of controlling the current passing through the DC/DC converter to track the passing current limit value for protecting the electricity storage device further comprises the step of: controlling the passing current limit value so as not to exceed a current value at which a fuse connected in series to the electricity storage device is blown.

6. A method according to claim 1, wherein the step of controlling the current passing through the DC/DC converter to track the passing current limit value for protecting the electricity storage device further comprises the step of: if the voltage of the electricity storage device exceeds an upper limit setting value of the prescribed range, limiting a current passing through the DC/DC converter in a direction to charge the electricity storage device to the passing current limit value.

7. A method according to claim 6, wherein, when the current passing through the DC/DC converter in the direction to charge the electricity storage device is limited to the passing current limit value, the voltage of the electric power generating device is increased through the DC/DC converter.

8. A method according to claim 7, wherein the electric power generating device comprises a fuel cell.

9. A method according to claim 1, wherein the step of controlling the current passing through the DC/DC converter to track the passing current limit value for protecting the electricity storage device further comprises the step of: if the voltage of the electricity storage device becomes lower than a lower limit setting value of the prescribed range, limiting a current passing through the DC/DC converter in a direction to discharge the electricity storage device to the passing current limit value.

10. A method according to claim 9, wherein, when the current passing through the DC/DC converter in the direction to discharge the electricity storage device is limited to the passing current limit value, the voltage of the electric power generating device is lowered through the DC/DC converter.

11. A method according to claim 10, wherein the electric power generating device comprises a fuel cell.

12. A method according to claim 1, which is applied to a fuel cell vehicle in which a load of the hybrid DC power supply system comprises an inverter-driven motor.

* * * * *